(12) United States Patent
Ishibashi et al.

(10) Patent No.: US 10,020,473 B2
(45) Date of Patent: Jul. 10, 2018

(54) ELECTRIC STORAGE DEVICE

(71) Applicant: HONDA MOTOR CO., LTD., Tokyo (JP)

(72) Inventors: Nobuaki Ishibashi, Wako (JP); Kanae Ohkuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 14/071,653

(22) Filed: Nov. 5, 2013

(65) Prior Publication Data

US 2014/0127553 A1    May 8, 2014

(30) Foreign Application Priority Data

Nov. 7, 2012  (JP) .................. 2012-245024

(51) Int. Cl.
  *H01M 2/10*  (2006.01)
  *H01M 2/20*  (2006.01)

(52) U.S. Cl.
  CPC .......... *H01M 2/1077* (2013.01); *H01M 2/206* (2013.01)

(58) Field of Classification Search
  CPC .................. H01M 2/1077; H01M 2/206
  See application file for complete search history.

(56) References Cited

U.S. PATENT DOCUMENTS 6,410,184 B1 * 6/2002 Horiuchi ............ B60L 11/1881
                                           361/601

FOREIGN PATENT DOCUMENTS

| CN | 102237546 | 11/2011 |
|---|---|---|
| JP | 2010-272520 | 12/2010 |
| JP | 2011-023180 | 2/2011 |
| JP | 5518384 B2 | 3/2011 |

OTHER PUBLICATIONS

Japanesec Office Action for corresponding JP Application No. 2012-245024, dated Aug. 28, 2014.
Chinese Office Action for corresponding CN Application No. 201310507812.0, dated Jul. 18, 2016 (w/ English machine translation).

* cited by examiner

*Primary Examiner* — Oi K Conley
(74) *Attorney, Agent, or Firm* — Mori & Ward, LLP

(57) ABSTRACT

An electric storage device includes a first connection plate, a second connection plate, a fastening member, and a plurality of storage modules. The plurality of storage modules are provided between the first connection plate and the second connection plate in a stacking direction. Each of the plurality of storage modules includes a plurality of rectangular storage cells stacked in the stacking direction to provide a stack of storage cells. The plurality of storage modules are arranged next to each other in a direction that crosses the stacking direction. The plurality of storage modules are clamped between the first connection plate and the second connection plate and fastened together by the fastening member. At least one of the first connection plate and the second connection plate is fastened to the plurality of storage modules in the stacking direction by the fastening member.

24 Claims, 11 Drawing Sheets

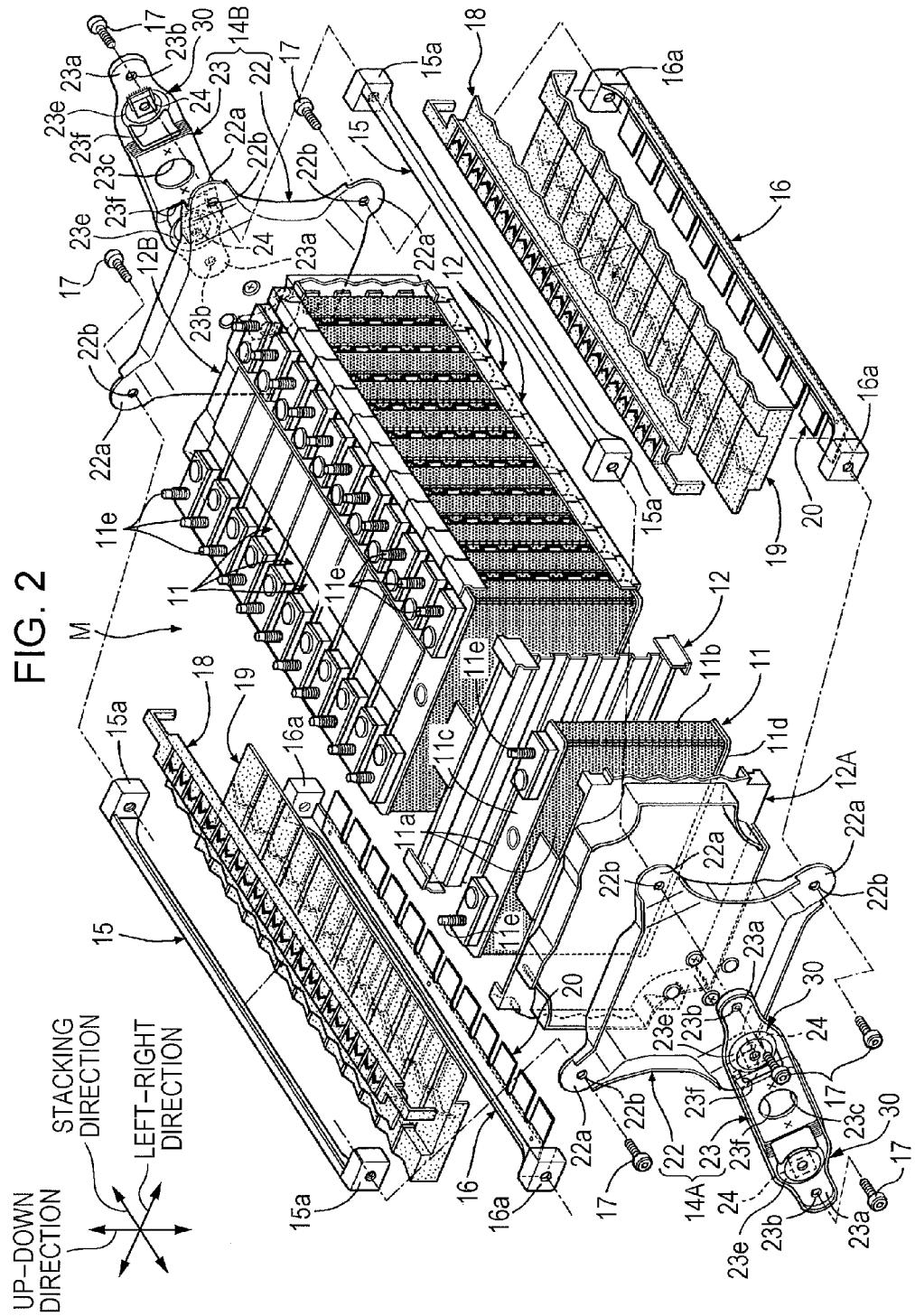

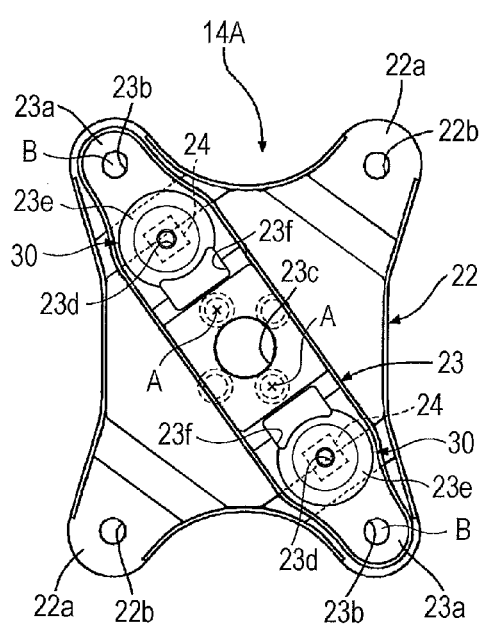
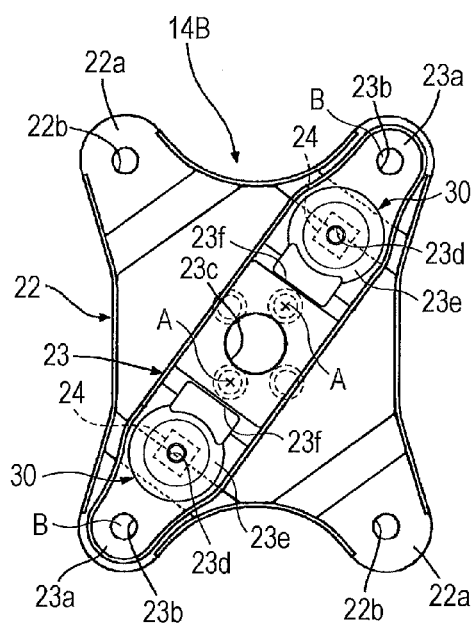
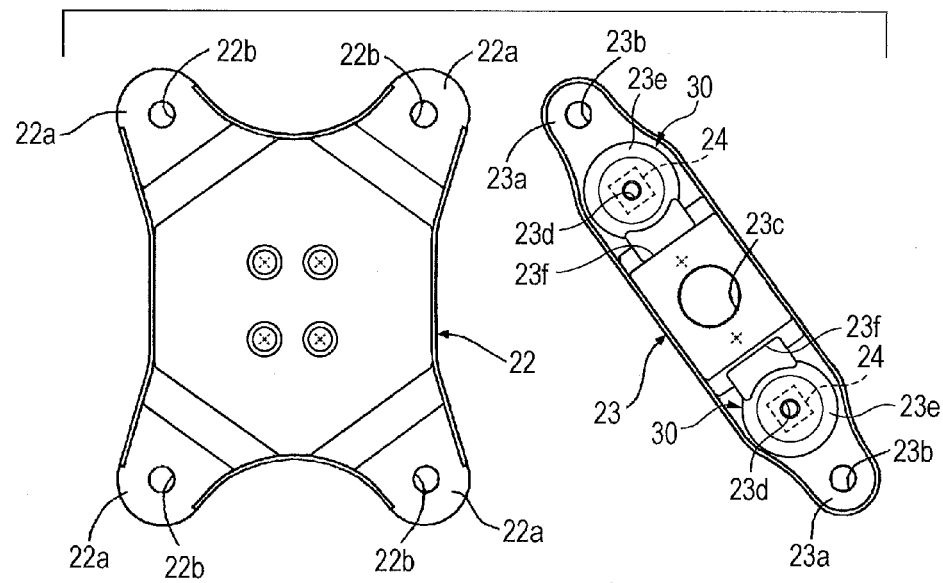
FIG. 3A
FIG. 3B
FIG. 3C

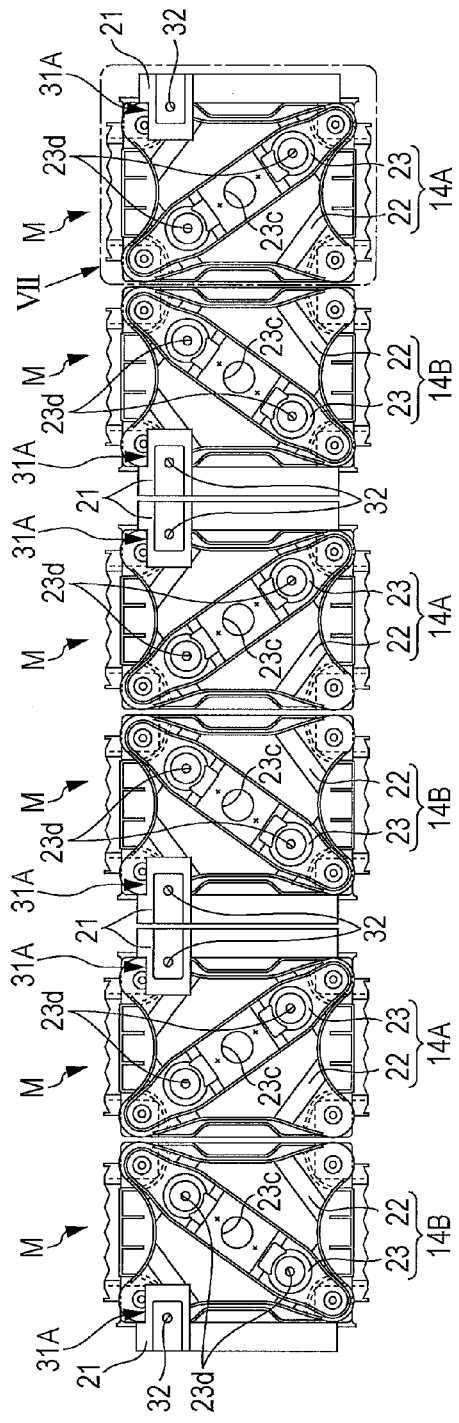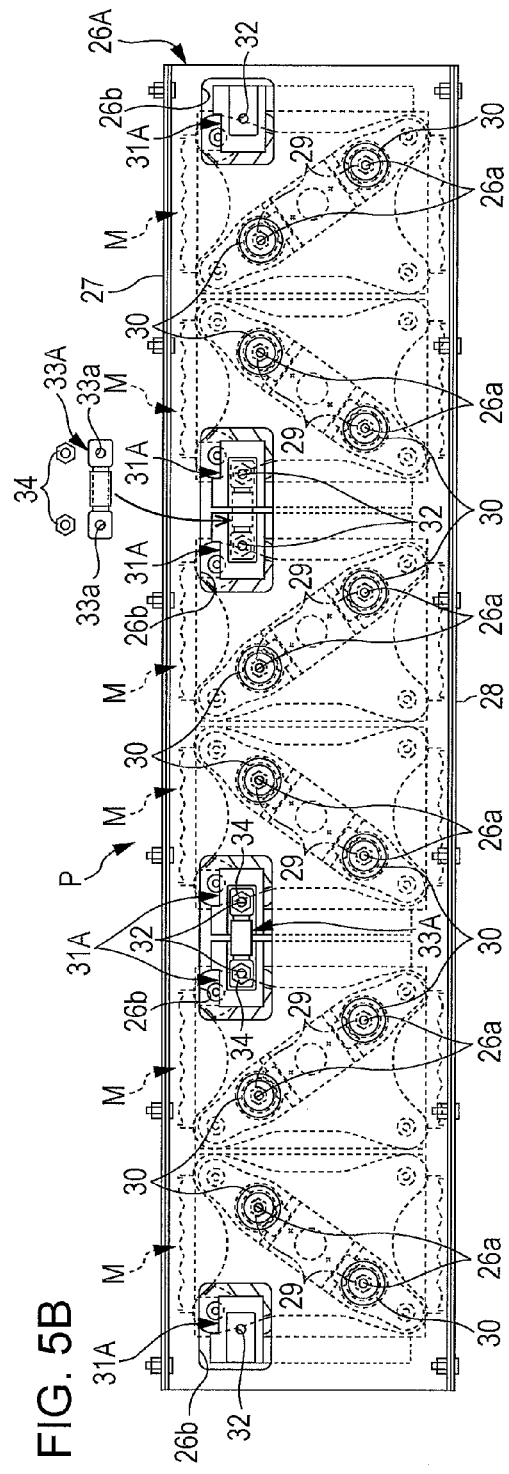

ELECTRIC STORAGE DEVICE

CROSS-REFERENCE TO RELATED APPLICATIONS

The present application claims priority under 35 U.S.C. § 119 to Japanese Patent Application No. 2012-245024, filed Nov. 7, 2012, entitled "Electric Storage Device." The contents of this application are incorporated herein by reference in their entirety.

BACKGROUND

1. Field

The present disclosure relates to an electric storage device.

2. Description of the Related Art

Japanese Unexamined Patent Application Publication No. 2010-272520 describes a storage module including a plurality of storage cells that are stacked together and a pair of end plates stacked on outer surfaces of the stack of storage cells, the storage cells and the end plates being fastened together by stack members. A pair of reinforcing members having outwardly bent attachment flanges at the bottom ends thereof are stacked on outer surfaces of the pair of end plates of the storage module in the stacking direction. The attachment flanges are fitted to pins (stud bolts) embedded in a pair of support plates, and are fastened with nuts.

SUMMARY

According to one aspect of the present invention, an electric storage device includes a first connection plate, a second connection plate, a fastening member, and a plurality of storage modules. The plurality of storage modules are provided between the first connection plate and the second connection plate in a stacking direction. Each of the plurality of storage modules includes a plurality of rectangular storage cells stacked in the stacking direction to provide a stack of storage cells. The plurality of storage modules are arranged next to each other in a direction that crosses the stacking direction. The plurality of storage modules are clamped between the first connection plate and the second connection plate and fastened together by the fastening member. At least one of the first connection plate and the second connection plate is fastened to the plurality of storage modules in the stacking direction by the fastening member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is an exploded perspective view of the storage module.

FIGS. 3A to 3C are diagrams illustrating the relationship between a main plate and a sub-plate in each end plate.

FIGS. 5A and 5B are diagrams illustrating the structure of FIG. 4 viewed in the direction of arrow VA, VB.

DESCRIPTION OF THE EMBODIMENTS

Figure 1:
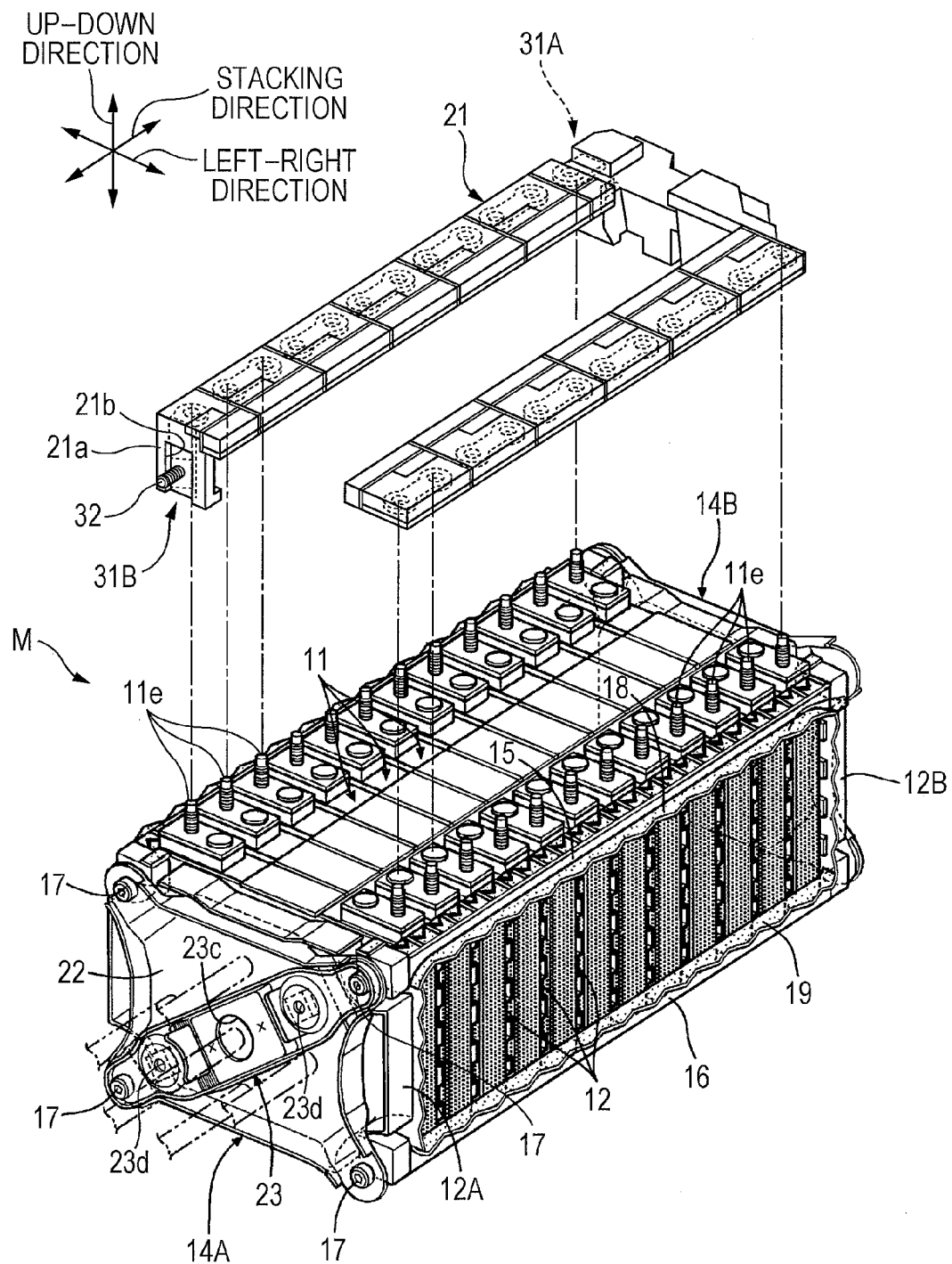
FIG. 1 is a perspective view of a storage module.
Figure 4:
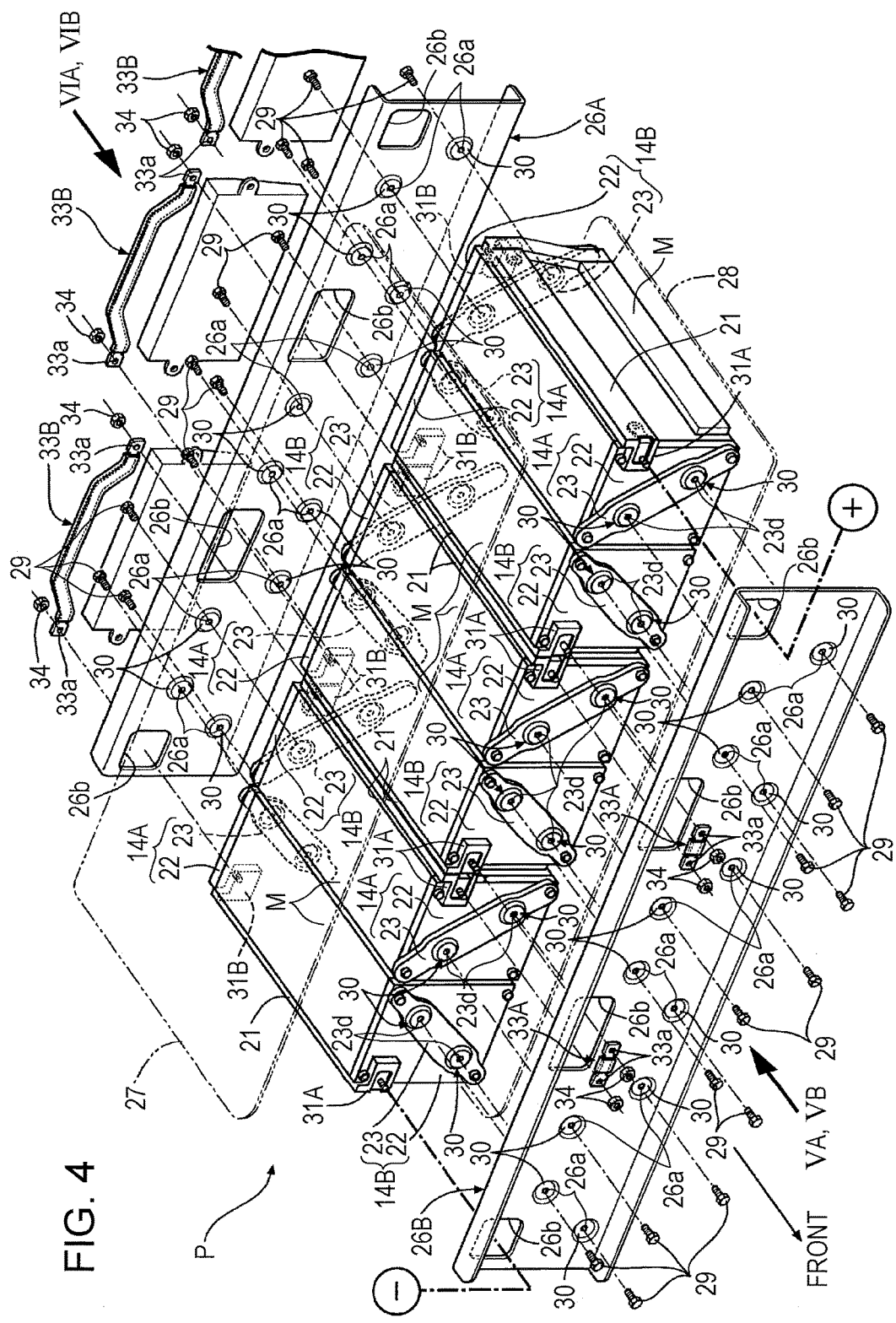
FIG. 4 is an exploded perspective view of an electric storage device.

The embodiments will now be described with reference to the accompanying drawings, wherein like reference numerals designate corresponding or identical elements throughout the various drawings.

The embodiment of the present disclosure will be described with reference to FIGS. 1 to 11B.

Referring to FIGS. 1 and 2, a storage module M, which is used as a power source of an electric vehicle or a hybrid vehicle, includes a predetermined number of storage cells 11 (twelve storage cells 11 in the present embodiment) which are stacked in a stacking direction. Each storage cell 11 has a rectangular parallelepiped shape, and includes a pair of main surfaces 11a that oppose each other, a pair of side surfaces 11b that are orthogonal to the main surfaces 11a and oppose each other, and top and bottom surfaces 11c and 11d that are orthogonal to the main surfaces 11a and the side surfaces 11b and oppose each other. Positive and negative electrodes 11e are provided on the top surface 11c.

In this specification, the direction that is orthogonal to the stacking direction and in which the top and bottom surfaces 11c and 11d of each storage cell 11 are arranged is defined as the up-down direction. The direction that is orthogonal to the stacking direction and in which the pair of side surfaces 11b of each storage cell 11 is arranged is defined as the left-right direction.

The main surfaces 11a of the twelve storage cells 11 and eleven rectangular plate-shaped intermediate storage cell holders 12, which are made of a synthetic resin, are alternately stacked in the stacking direction. A pair of rectangular plate-shaped end storage cell holders 12A and 12B, which are also made of a synthetic resin, are stacked on the outer surfaces of the two outermost storage cells 11 in the stacking direction, and a pair of end plates 14A and 14B, which are made of a metal, are stacked on the outer surfaces of the end storage cell holders 12A and 12B in the stacking direction. The eleven intermediate storage cell holders 12 have the same shape and are interchangeable. The end storage cell holders 12A and 12B have different shapes, and the shapes thereof also differ from the shape of the intermediate storage cell holders 12.

The storage module M is assembled by stacking the storage cells 11, the intermediate storage cell holders 12, the end storage cell holders 12A and 12B, and the end plates 14A and 14B in the stacking direction and connecting four corners of the end plate 14A to the respective corners of the end plate 14B with a pair of upper restraining bands 15 (restraining band), which are rod-shaped metal members having an L-shaped cross section, and a pair of lower restraining bands 16 (restraining band), which are also rod-shaped metal members having an L-shaped cross section. More specifically, the storage module M is assembled by bringing thick end-plate fixing portions 15a, which are provided at both ends of the upper restraining bands 15, and thick end-plate fixing portions 16a, which are provided at both ends of the lower restraining bands 16, into contact with the respective corners of the end plates 14A and 14B and screwing bolts 17 into the end-plate fixing portions 15a and 16b through the end plates 14A and 14B.

An upper insulator 18 is disposed between each upper restraining band 15 and the unit including the storage cells 11, the intermediate storage cell holders 12, and the end storage cell holders 12A and 12B. The upper insulators 18 are made of a synthetic resin and serve to prevent liquid junction between the storage cells 11 and the upper restraining bands 15 due to condensate. Similarly, a lower insulator 19 is disposed between each lower restraining band 16 and the unit including the storage cells 11, the intermediate storage cell holders 12, and the end storage cell holders 12A and 12B. The lower insulators 19 are also made of a synthetic resin and serve to prevent liquid junction between the storage cells 11 and the lower restraining bands 16 due to condensate. In addition, leaf springs 20 are disposed between each lower restraining band 16 and the corresponding lower insulator 19 to press the bottom surfaces 11d of the storage cells 11 upward and prevent rattling.

A U-shaped storage-cell busbar 21 is attached to the top surface of the storage module M. The storage-cell busbar 21 electrically connects the electrodes 11e of the twelve storage cells 11 in series. Accordingly, among the pair of end plates 14A and 14B, one end plate 14A serves as a high-potential-side (positive side) end plate, and the other end plate 14B serves as a low-potential-side (negative side) end plate. The end plates 14A and 14B have different shapes and are not interchangeable so that, when a plurality of storage modules M are connected in series or parallel, high-potential-side and low-potential-side terminals can be prevented from being assembled incorrectly. Since the cost will increase when two types of end plates 14A and 14B having different shapes are individually manufactured, in the present embodiment, the end plates 14A and 14B having different shapes are formed by combining main plates 22 and sub-plates 23.

As illustrated in FIGS. 3A to 3C, 7, and 8, each main plate 22 has a substantially rectangular shape and includes restraining-band fastening portions 22a that project outward at four corners thereof, each restraining-band fastening portion 22a having a bolt hole 22b formed therein. Each sub-plate 23 has a substantially linear shape and has restraining-band fastening portions 23a at both ends thereof, each restraining-band fastening portion 23a having a bolt hole 23b formed therein. Each main plate 22 and the corresponding sub-plate 23 are welded together at two positions (in fixing regions A).

Each sub-plate 23 includes a pair of fastening portions 30 having respective protruding portions 23e that have a truncated conical shape and protrude in a direction away from the corresponding main plate 22, respective fastening holes 23d formed at the centers of the protruding portions 23e, and respective cut portions 23f formed by cutting parts of the protruding portions 23e at the periphery of the protruding portions 23e. Weld nuts 24 are welded on the back surface of the sub-plate 23 at locations where the fastening holes 23d are formed at the centers of the protruding portions 23e of the fastening portions 30. A single jig receiving hole 23c is formed in a central portion of the sub-plate 23.

Each main plate 22 and the corresponding sub-plate 23 are welded together in the pair of fixing regions A, and are fastened together by the bolts 17 in a pair of fixing regions B in which the bolt holes 22b and 23b are formed. The fastening portions 30 are disposed between the fixing regions A and B, and are easily deformable owing to the protruding portions 23e and the cut portions 23f.

As is clear from FIGS. 3A to 3C, one end plate 14A is formed by welding one main plate 22 and one sub-plate 23 together in the fixing regions A such that the sub-plate 23 extends along one of the two diagonals of the main plate 22. The other end plate 14B is formed by welding one main plate 22 and one sub-plate 23 together in the fixing regions A such that the sub-plate 23 extends along the other one of the two diagonals of the main plate 22. The end plates 14A and 14B are different members having different shapes that are plane-symmetrical with respect to each other, similar to the shapes of left and right hands. Therefore, when one end plate 14A is configured as a high-potential-side end plate and the other end plate 14B as a low-potential-side end plate, storage modules M can be connected in series or parallel without being incorrectly assembled.

Figure 7:
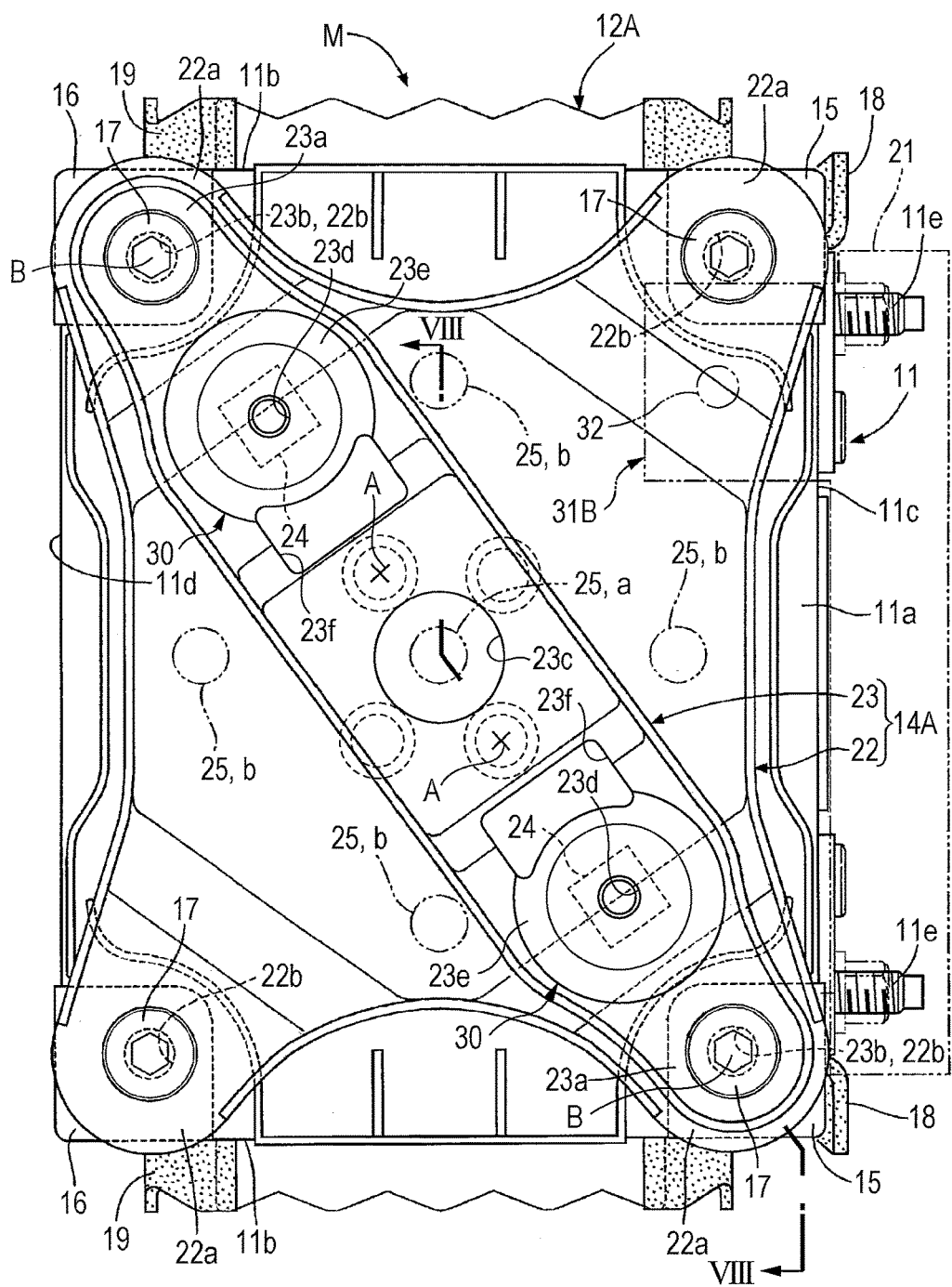
FIG. 7 is an enlarged view of part VII in FIG. 5A.

In the state in which the end plates 14A and 14B are assembled by bonding the main plates 22 to the respective sub-plates 23, five pressing points a and b are provided on each main plate 22 (see FIG. 7). A central pressing point a is provided at the center of the jig receiving hole 23c formed in the sub-plate 23, and four peripheral pressing points b are provided at locations outside the sub-plate 23.

Figure 8:
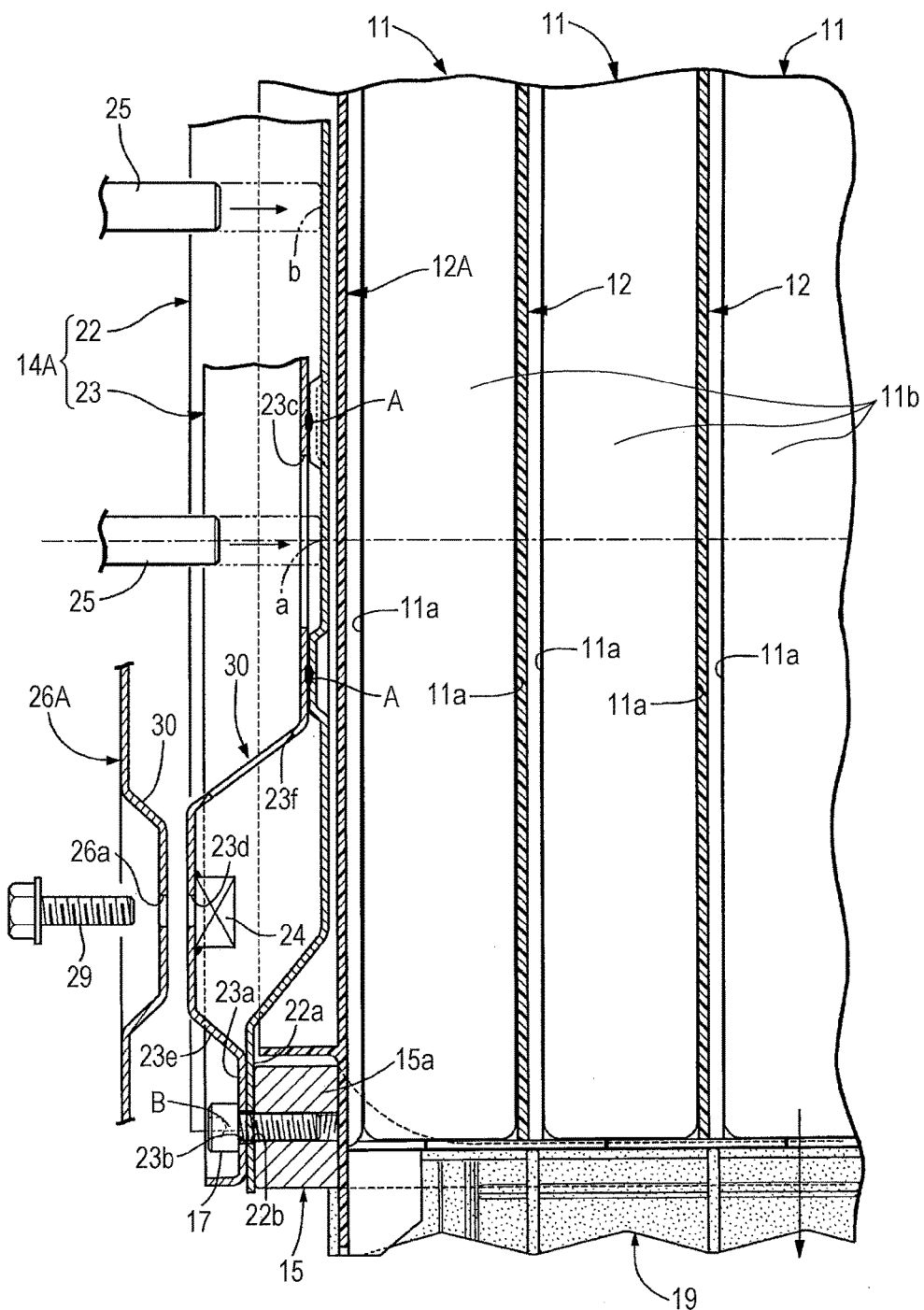
FIG. 8 is a sectional view of FIG. 7 taken along line VIII-VIII.

To assemble each storage module M, the twelve storage cells 11 and the eleven intermediate storage cell holders 12 are alternately stacked, and the pair of end storage cell holders 12A and 12B and the pair of end plates 14A and 14B are successively stacked on the stack at both ends of the stack in the stacking direction. In this state, as illustrated in FIGS. 7 and 8, the main plates 22 of the pair of end plates 14A and 14B are pressed toward each other by a pair of jigs, each of which has five pressing pins 25, at the five pressing points a and b. Thus, the storage cells 11, the end storage cell holders 12A and 12B, and the intermediate storage cell holders 12 are compressed. In this state, four bolts 17 are screwed into the end-plate fixing portions 15a of the upper restraining bands 15 and the end-plate fixing portions 16a of the lower restraining bands 16 at each end of the storage module M. Thus, the storage module M is assembled.

Among the four bolts 17, two bolts 17 are inserted through only the bolt holes 22b of the corresponding main plate 22, but the other two bolts 17 are inserted through not only the bolt holes 22b of the main plate 22 but also the bolt holes 23b of the corresponding sub-plate 23. Therefore, the strength of each of the end plates 14A and 14B can be increased by fastening the main plate 22 and the sub-plate 23 together with the other two bolts 17. The central pressing point a is pressed by the corresponding pressing pin 25 that is inserted through the jig receiving hole 23c formed in the sub-plate 23. Therefore, even when there is a gap between the main plate 22 and the sub-plate 23, the pressing point a of the main plate 22 can be efficiently pressed without damaging the sub-plate 23. In addition, the five pressing points a and b can be arranged in a balanced manner and pressed by a uniform pressing force.

As illustrated in FIGS. 4 to 6B, six storage modules M are connected in series to constitute an electric storage device P. The electric storage device P includes first and second connection plates 26A and 26B, an upper plate 27, and a lower plate 28. The six storage modules M are arranged next to each other between the first and second connection plates 26A and 26B at an angle of 90° with respect to the up-down direction. Each of the first and second connection plates 26A and 26B includes twelve fastening portions 30 having a truncated conical shape. The end plates 14A and 14B of the six storage modules M are fastened to the first and second connection plates 26A and 26B by inserting bolts 29 (fastening member) through reference fastening holes 26a formed at the centers of the fastening portions 30 and the fastening holes 23d formed in the sub-plates 23 and screwing the bolts 29 into the weld nuts 24 on the back surfaces of the sub-plate 23. Then, the electric storage device P is assembled by fastening the upper plate 27 and the lower plate 28 to the first and second connection plates 26A and 26B. In this state, top portions of the fastening portions 30 of the first and second connection plates 26A and 26B are in contact with top portions of the respective fastening portions 30 of the end plates 14A and 14B.

As described above, the bolts 29 used to fix the first and second connection plates 26A and 26B to the six storage modules M are fastened in the stacking direction of the storage cells 11. Therefore, a sufficient distance can be provided between the tool used to fasten the bolts 29 and each of the first and second connection plates 26A and 26B without changing the shape of the first and second connection plates 26A and 26B. As a result, the work efficiency of the fastening process can be increased and the size of the first and second connection plates 26A and 26B can be reduced.

In addition, the end plates 14A and 14B and the first and second connection plates 26A and 26B, which are fastened by the bolts 29, include the fastening portions 30 that are easily deformable by the fastening force applied by the bolts 29. Therefore, even when the storage modules M have different lengths in the stacking direction owing to differences in thickness between the storage cells 11, the fastening portions 30 of the end plates 14A and 14B and the first and second connection plates 26A and 26B can be deformed so as to absorb the differences. Thus, the end plates 14A and 14B and the first and second connection plates 26A and 26B can be prevented from receiving an excessive stress.

Each of the fastening portions 30 of the end plates 14A and 14B is located between two fixing regions A and B in which each sub-plate 23 is fixed to the corresponding main plate 22, and is therefore sufficiently spaced from the fixing regions A and B and easily deformable. Therefore, the differences in dimension in the stacking direction between the storage modules M can be effectively absorbed. In particular, each fastening portion 30 includes the protruding portion 23e that protrudes from the corresponding sub-plate 23, the fastening hole 23d that is formed in the protruding portion 23e and through which the corresponding bolt 29 extends, and the cut portion 23f formed by cutting a part of the protruding portion 23e. Therefore, the differences in dimension in the stacking direction between the storage modules M can be more effectively absorbed by causing the protruding portions 23e having the cut portions 23f to deform.

The end-plate fixing portions 15a and 16a, which are in contact with the outer surfaces of the stack of storage cells 11 in the stacking direction, are respectively provided at the ends of the upper and lower restraining bands 15 and 16, and the end plates 14A and 14B are fixed to the end-plate fixing portions 15a and 16a. Therefore, vibration applied to the end plates 14A and 14B through the first and second connection plates 26A and 26B is transmitted to the upper and lower restraining bands 15 and 16 through the end plates 14A and 14B, so that stress concentration does not easily occur in the end plates 14A and 14B. Accordingly, the weight of the end plates 14A and 14B can be reduced by reducing the strength of the end plates 14A and 14B.

The end plates 14A and 14B are formed by stacking the sub-plates 23 onto the main plates 22, and the first and second connection plates 26A and 26B are fastened to the sub-plates 23. Since the sub-plates 23 are fixed to the end-plate fixing portions 15a and 16a of the upper and lower restraining bands 15 and 16, vibration applied to the first and second connection plates 26A and 26B can be transmitted to the upper and lower restraining bands 15 and 16 through the sub-plates 23 of the end plates 14A and 14B and the end-plate fixing portions 15a and 16a, so that stress concentration does not easily occur in the main plates 22 of the end plates 14A and 14B.

As illustrated in FIGS. 1, 5A, 5B, 6A, and 6B, a pair of storage-module terminals 31A and 31B are provided at respective ends of each storage-cell busbar 21. The storage-module terminals 31A and 31B include respective stud bolts 32 that project outward in the stacking direction. An insulating cover 21a of each storage-cell busbar 21 has cut portions 21b in regions around the stud bolts 32. Each cut portion 21b surrounds three sides of the corresponding stud bolt 32 and is open at one side, and the cut portions 21b are oriented so that the open sides thereof face different directions. More specifically, in the storage-module terminals 31A, which are exposed at openings 26b formed in the first connection plate 26A, the open sides of the cut portions 21b formed around the stud bolts 32 face the outside of the respective storage modules M (see FIGS. 5A and 5B). In the storage-module terminals 31B, which are exposed at openings 26b formed in the second connection plate 26B, the open sides of the cut portions 21b formed around the stud bolts 32 face the inside of the respective storage modules M (see FIGS. 6A and 6B).

As illustrated in FIGS. 5A and 5B, four storage-module terminals 31A that are disposed in an inner region of the first connection plate 26A are electrically connected to one another by two short storage-module busbars 33A. Each short storage-module busbar 33A has bolt holes 33a at both ends thereof. The stud bolts 32 of the storage-module terminals 31A of two storage modules M that are adjacent to each other are inserted through the bolt holes 33a, and nuts 34 are fastened to the stud bolts 32.

Figure 6A:
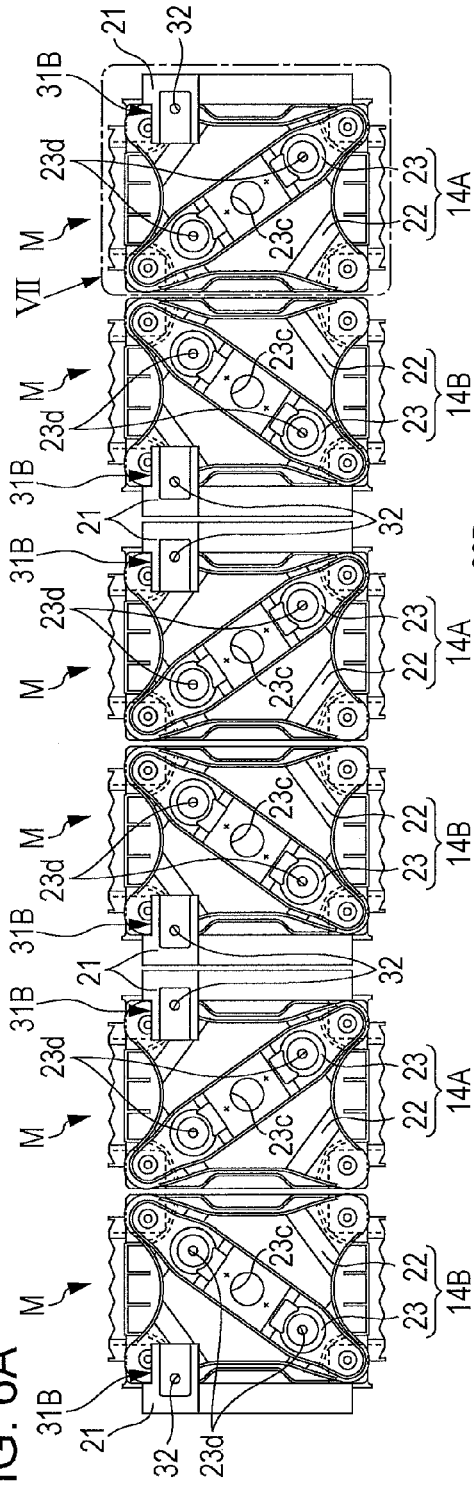
FIGS. 6A and 6B are diagrams illustrating the structure of FIG. 4 viewed in the direction of arrow VIA, VIB.
Figure 6B:
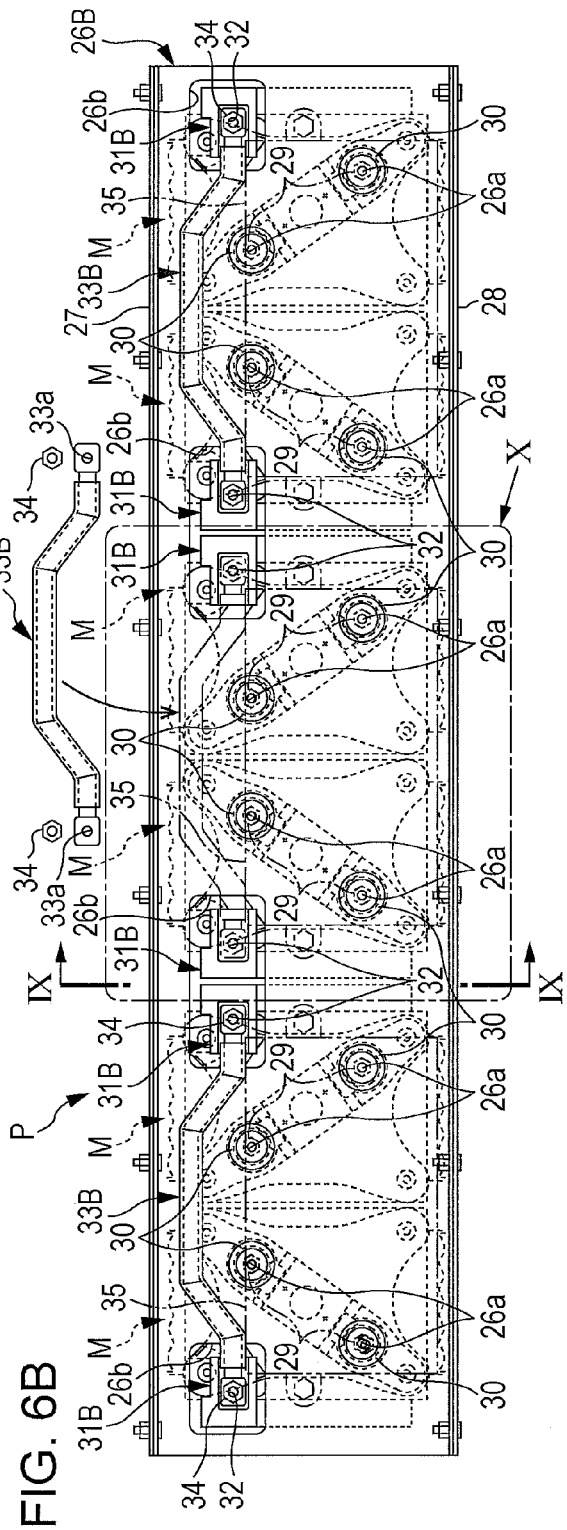
Figure 10:
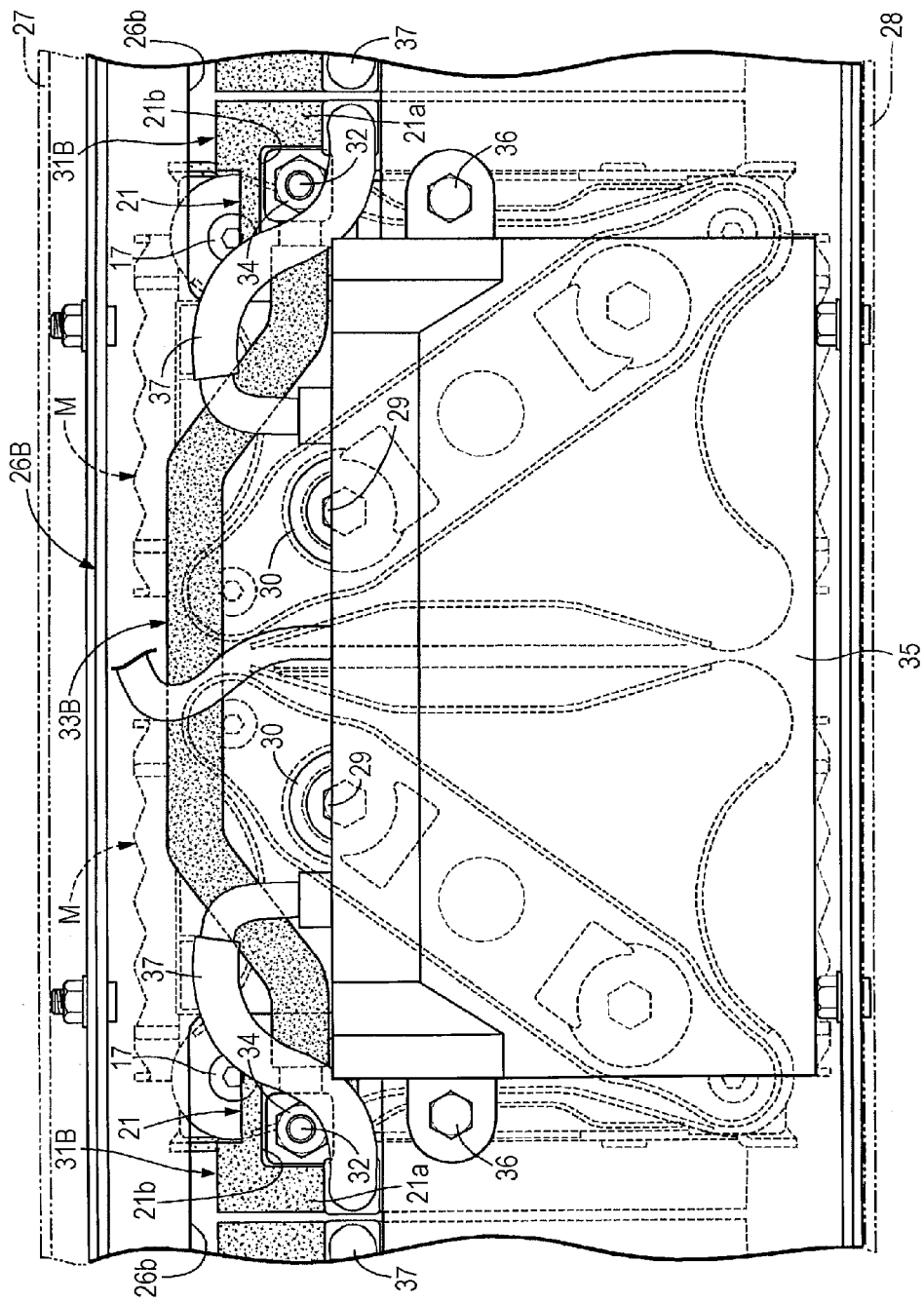
FIG. 10 is an enlarged view of part X in FIG. 6B.

As illustrated in FIGS. 6A, 6B, and 10, the six storage-module terminals 31B at the second-connection-plate-26B side are connected to one another by three long storage-module busbars 33B. Each long storage-module busbar 33B has bolt holes 33a at both ends thereof. The stud bolts 32 of the storage-module terminals 31B of two storage modules M that are adjacent to each other are inserted through the bolt holes 33a, and nuts 34 are fastened to the stud bolts 32.

As described above, the insertion direction of the bolts 29 for fastening the first and second connection plates 26A and 26B to the end plates 14A and 14B is the same as the attachment direction of the nuts 34 for fastening the short storage-module busbars 33A and the long storage-module busbars 33B to the stud bolts 32 of the storage-module terminals 31A and 31B. However, the bolts 29 and the nuts 34 cannot be attached when they are switched. Accordingly, the risk of incorrect assembly due to switching of the bolts 29 and the nuts 34 can be reduced. As a result, the risk that, for example, the first and second connection plates 26A and 26B will be fastened to the end plates 14A and 14B with bolts longer than the bolts 29 that are expected to be used by mistake and the storage cells 11 will be grounded by the longer bolts can be reduced.

In particular, the fastening distance of the stud bolts 32 (the thickness of the short storage-module busbars 33A and the long storage-module busbars 33B) is smaller than the fastening distance of the bolts 29 (the sum of the thickness of the first and second connection plates 26A and 26B and the thickness of the end plates 14A and 14B). Therefore, according to the related art in which short bolts are used instead of the stud bolts 32, there is a risk that grounding will occur as a result of bolts longer than the bolts to be used (in other words, the bolts 29 for fixing the first and second connection plates 26A and 26B) being used by mistake. In contrast, according to the present disclosure, since the stud bolts 32 are used, the risk that switching of the bolts will occur can be eliminated and the above-described problem can be solved.

When the short storage-module busbars 33A and the long storage-module busbars 33B are assembled, the stud bolts 32 extend in a direction that crosses the vertical direction. Therefore, when the stud bolts 32 of the storage-module terminals 31A and 31B are engaged with the bolt holes 33a formed in the short storage-module busbars 33A and the long storage-module busbars 33B, the nuts 34 can be fastened to the stud bolts 32 while the short storage-module busbars 33A and the long storage-module busbars 33B are provisionally retained and prevented from falling due to gravity.

Among the six storage modules M that are arranged next to each other, the first and second storage modules M from each end in the arrangement direction, for example, are arranged such that the storage-module terminals 31A and 31B thereof face away from each other, and are connected to each other by one of the long storage-module busbars 33B. The second and third storage modules M from each end in the arrangement direction are arranged such that the storage-module terminals 31A and 31B thereof face each other, and are connected to each other by one of the short storage-module busbars 33A. Therefore, the long storage-module busbars 33B and the short storage-module busbars 33A, which have different lengths, cannot be switched and incorrectly assembled by mistake and incorrect assembly can thus be prevented. In addition, even when the number of storage modules M is increased, the short storage-module busbars 33A and the long storage-module busbars 33B may be used for all of the storage modules M. Therefore, the cost can be reduced.

The storage-module terminals 31A and 31B are covered with the insulating covers 21a, and the cut portions 21b of the covers 21a that cover the storage-module terminals 31B, to which the long storage-module busbars 33B are connected, and the cut portions 21b of the covers 21a that cover the storage-module terminals 31A, to which the short storage-module busbars 33A are connected, are oriented in different directions (see FIGS. 5A, 5B, 6A, and 6B). Therefore, even when the long storage-module busbars 33B and the short storage-module busbars 33A are switched by mistake, they interfere with the covers 21a and cannot be assembled. Thus, incorrect assembly of the long storage-module busbars 33B and the short storage-module busbars 33A can be more reliably prevented.

Figure 9:
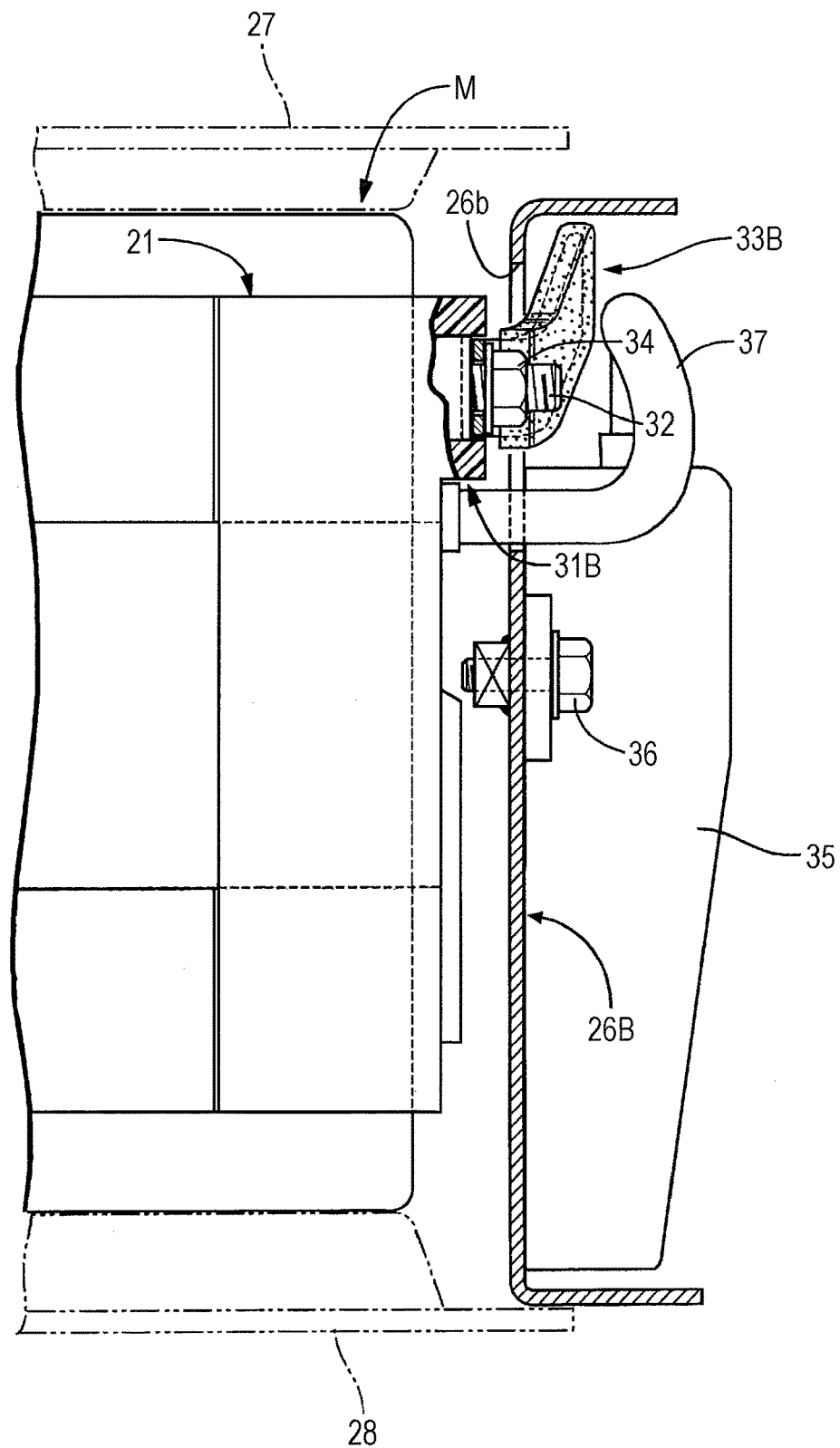
FIG. 9 is a sectional view of FIG. 6B taken along line IX-IX.

As illustrated in FIGS. 9 and 10, a voltage sensor 35 is fixed with bolts 36 to a portion of the second connection plate 26B that faces two adjacent storage modules M. The voltage sensor 35 is shared by the two storage modules M, and is capable of detecting a voltage of the storage cells 11 included in each of the storage modules M by switching an electrical circuit included therein. Wires 37 that connect the storage cells 11 to the voltage sensor 35 extend from the storage-cell busbars 21. Since the storage-cell busbars 21 of the two storage modules M are disposed at both sides of the voltage sensor 35, the two wires 37 can be connected to the voltage sensor 35 without interfering with the voltage sensor 35. Accordingly, it is not necessary that the voltage sensor 35 be spaced from the second connection plate 26B to prevent the wires 37 from interfering with the voltage sensor 35. As a result, the size of the electric storage device P can be reduced.

Since the six storage modules M are electrically connected in series in the electric storage device P, the end plates 14A and 14B are alternately arranged on each of the first and second connection plates 26A and 26B (see FIGS. 5A, 5B, 6A, and 6B). In the case where the storage modules M are mounted in a vehicle in a horizontal orientation, the two fastening holes 23d formed in each of the high-potential-side end plates 14A are arranged along a line that extends diagonally upward and leftward, and the two fastening holes 23d formed in each of the low-potential-side end plates 14B are arranged along a line that extends diagonally upward and rightward. Accordingly, the reference fastening holes 26a that are formed in the first and second connection plates 26A and 26B and that correspond to the fastening holes 23d are also arranged along lines that extend diagonally upward and leftward or lines that extend diagonally upward and rightward. If the storage modules M are arranged such that the high-potential and low-potential sides thereof are reversed, the storage modules M cannot be attached to the first and second connection plates 26A and 26B, and incorrect assembly can thus be reliably prevented.

The end plates 14A and 14B having different shapes are formed by combining the main plates 22 and the sub-plates 23 having simple structures. Therefore, the number of types of components can be minimized and the cost can be reduced.

Figure 11A:
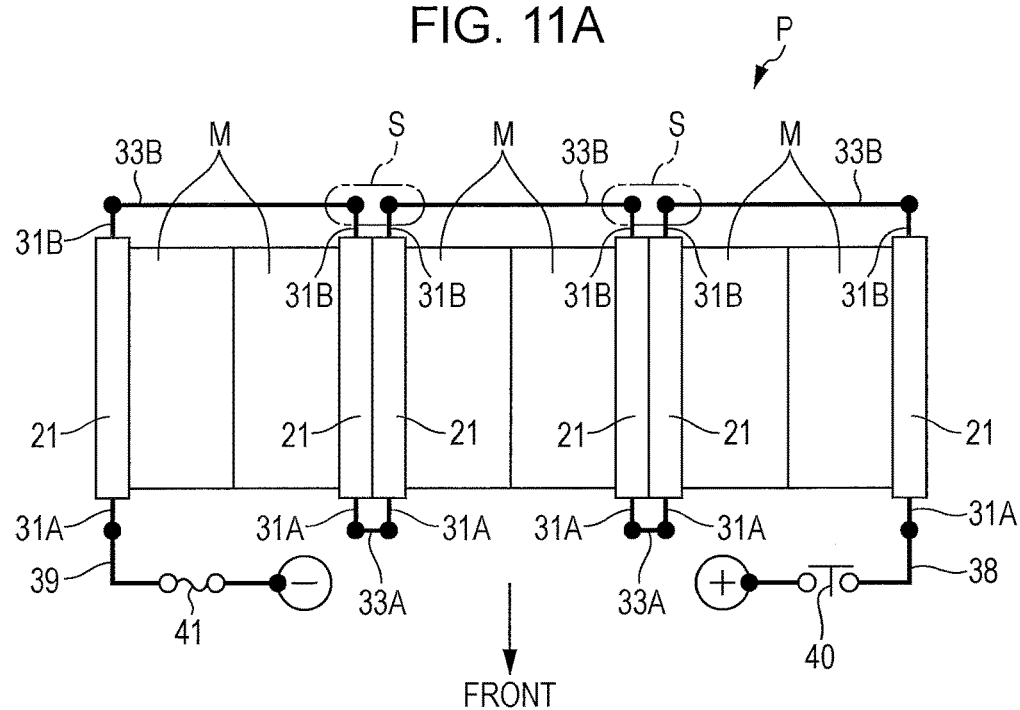
FIGS. 11A and 11B are diagrams illustrating the states in which storage modules are electrically connected.

As illustrated in FIG. 11A, the electric storage device P is mounted in a vehicle such that the short storage-module busbars 33A face the front of the vehicle and the long storage-module busbars 33B face the rear of the vehicle. Wires 38 and 39 that extend from the storage-module terminals 31A at the front sides of the two storage modules M at the ends of the electric storage device P are connected to electronic devices including a contactor 40 and a fuse 41, respectively. Therefore, even when, for example, a rear collision of the vehicle occurs and a conductive component, such as a bumper beam, comes into contact with the electric storage device P, there are only two regions S in which short circuiting may occur. Since the pair of main terminals that have a largest potential difference therebetween in the electric storage device P are at a side closer to the front of the vehicle, short-circuiting of the main terminals can be prevented in case of a rear collision of the vehicle. In addition, since the wires 38 and 39 extend toward the contactor 40 and the fuse 41 from the front side of the electric storage device P, the lengths of the wires 38 and 39 can be minimized.

Figure 11B:
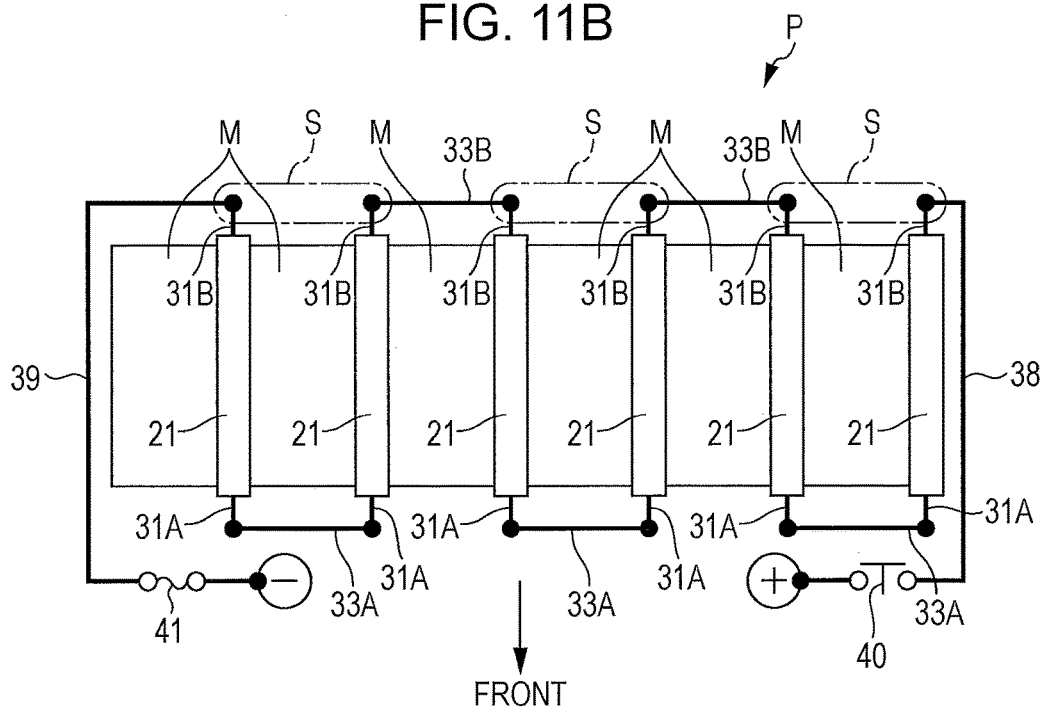

FIG. 11B illustrates an electric storage device P according to the related art in which six storage modules M are oriented in the same horizontal direction. If, for example, a rear collision of a vehicle occurs and a conductive component, such as a bumper beam, comes into contact with the electric storage device P, the number of regions S in which short circuiting may occur is three, which is greater than that in the present embodiment. In addition, since the pair of main terminals are at a side closer to the rear of the vehicle, there is a risk that short-circuiting of the main terminals will occur in case of a rear collision of the vehicle. In addition, wires 38 and 39 extend from a rear side of the electric storage device P to a contactor 40 and a fuse 41, respectively, and the lengths of the wires 38 and 39 are greater than those in the present embodiment.

As described above, according to the present embodiment, the risk that the storage-module terminals 31B of the electric storage device P will be short-circuited in case of a rear collision of the vehicle can be reduced. In addition, the lengths of the wires 38 and 39 which connect the electric storage device P to the contactor 40 and the fuse 41, respectively, can be reduced.

Although an embodiment of the present disclosure is described above, various design changes can be made within the scope of the present disclosure.

For example, the storage cells 11 according to the embodiment are not limited to lithium-ion batteries, and may instead be other types of batteries or capacitors.

In addition, although the present disclosure is applied to the fastening structures of both the first and second connection plates 26A and 26B in the above-described embodiment, the present disclosure may instead be applied to the fastening structure of only one of the first and second connection plates 26A and 26B.

In addition, although the fastening portions 30 are provided on both the end plates 14A and 14B and the first and second connection plates 26A and 26B in the above-described embodiment, the fastening portions 30 may instead be provided only on the end plates 14A and 14B or the first and second connection plates 26A and 26B.

In addition, although the fastening portions 30 are provided on the sub-plates 23 of the end plates 14A and 14B, the fastening portions 30 may instead be provided on the main plates 22.

In addition, although the contactor 40 is provided only at the positive-terminal side in the above-described embodiment, the contactor 40 may be provided not only at the positive-terminal side but also at the negative-terminal side. In this case, an additional contactor 40 may be disposed between the fuse 41 and the negative terminal in FIG. 11A.

In addition, although two short storage-module busbars 33A are provided in the above-described embodiment, one of them may be replaced by a service plug or a main switch for turning off the power supply for repair.

In addition, although the first and second storage modules M from each end in the arrangement direction are arranged such that the storage-cell busbars 21 thereof face away from each other in the above-described embodiment, they may instead be arranged such that the storage-cell busbars 21 thereof face each other. In this case, a surface of the third storage module M at a side opposite to the storage-cell-busbar-21 side faces a surface of the second storage module M at a side opposite to the storage-cell-busbar-21 side, and a surface of the third storage module M at the storage-cell-busbar-21 side faces a surface of the fourth storage module M at the storage-cell-busbar-21 side. In this case, the number of short storage-module busbars 33A is larger than the number of long storage-module busbars 33B, and the cost of the electric storage device P can be reduced as a result.

According to an aspect of the embodiment, an electric storage device includes a plurality of storage modules, each of which includes a plurality of rectangular storage cells stacked in a stacking direction, the storage modules being arranged next to each other in a direction that crosses the stacking direction, and being clamped between a first connection plate and a second connection plate provided at respective sides in the stacking direction and fastened together by a fastening member. At least one of the first and second connection plates is fastened in the stacking direction by the fastening member.

Accordingly, a sufficient distance can be provided between the tool used to fasten the fastening member and the at least one of the first and second connection plates without changing the shape of the at least one of the first and second connection plates. As a result, the work efficiency of the fastening process can be increased and the size of the at least one of the first and second connection plates can be reduced.

Each storage module and/or the at least one of the first and second connection plates according to the embodiment may include a fastening portion fastened by the fastening member, the fastening portion being more easily deformable in the stacking direction than other portions.

In this case, the fastening portion can be easily deformed by the fastening load applied by the fastening member, so that differences in dimension in the stacking direction between the storage modules can be absorbed.

Each storage module according to the embodiment may include a pair of end plates stacked on the respective ends of the stack of storage cells in the stacking direction, each end plate including a main plate and a sub-plate that are stacked together and fixed to each other in a plurality of fixing regions, and the fastening portion may be disposed between two of the fixing regions that are adjacent to each other.

In this case, since the fastening portion is sufficiently spaced from the fixing regions and is easily deformed, differences in dimension in the stacking direction between the storage modules can be effectively absorbed.

The fastening portion according to the embodiment may have a protruding portion that protrudes from the main plate or the sub-plate, a fastening hole that is formed in the protruding portion and through which the fastening member extends, and a cut portion formed by cutting a part of the protruding portion.

In this case, differences in dimension in the stacking direction between the storage modules can be absorbed by causing the protruding portion having the cut portion to deform.

Each storage module according to the embodiment may include a pair of end plates stacked on the respective ends of the stack of storage cells in the stacking direction, and each of the end plates and the first and second connection plates may include the fastening portion, the fastening portions of the end plates and the corresponding fastening portions of the first and second connection plates projecting toward each other and including top portions that are in contact with each other.

Accordingly, differences in dimension in the stacking direction between the storage modules can be more effectively absorbed by causing the fastening portions of the end plates and the fastening portions of the first and second connection plates to deform.

Each storage module according to the embodiment may include a pair of end plates stacked on the respective ends of the stack of storage cells in the stacking direction and a restraining band that connects the end plates to each other, the restraining band including end-plate fixing portions at both ends thereof, the end-plate fixing portions being located on outer surfaces of the stack of storage cells in the stacking direction. The end plates may be fixed to the respective end-plate fixing portions.

In this case, vibration applied to the first and second connection plates are transmitted to the restraining band through the end plates, and are not easily transmitted to the end plates. Therefore, the weight of the end plates can be reduced by reducing the strength of the end plates.

Each end plate according to the embodiment may include a main plate and a sub-plate that are stacked together. The first and second connection plates may be fastened to the respective sub-plates, and the sub-plates may be fixed to the respective end-plate fixing portions.

In this case, vibration applied to the first and second connection plates are transmitted to the restraining band through the sub-plates of the end plates and the end-plate fixing portions, and are not easily transmitted to the main plates of the end plates. Therefore, the weight of the main plates can be reduced by reducing the strength of the main plates.

Obviously, numerous modifications and variations of the present invention are possible in light of the above teachings. It is therefore to be understood that within the scope of the appended claims, the invention may be practiced otherwise than as specifically described herein.

What is claimed is:

1. An electric storage device comprising:
a first connection plate;
a second connection plate;
a plurality of fastening members; and
a plurality of storage modules provided between the first connection plate and the second connection plate in a stacking direction, each of the plurality of storage modules including a plurality of rectangular storage cells stacked in the stacking direction to provide a stack of storage cells, the plurality of storage modules being arranged next to each other in a direction perpendicular to the stacking direction, the plurality of storage modules being clamped between the first connection plate and the second connection plate and fastened together by respective ones of the fastening members, at least one of the first connection plate and the second connection plate being fastened to the plurality of storage modules in the stacking direction by respective ones of the fastening members,
wherein each of the plurality of storage modules includes a pair of end plates stacked on respective ends of the stack of storage cells in the stacking direction, each end plate includes a main plate and a substantially linear sub-plate that are stacked together, each sub-plate extends linearly from a first corner to a second corner thereof, and adjacent end plates that are adjacent to each other in the direction perpendicular to the stacking direction have sub-plates in which the respective first corners and the respective second corners are oriented in different directions with respect to the direction perpendicular to the stacking direction, and
wherein the adjacent end plates that are adjacent to each other in the direction perpendicular to the stacking direction are connected to the first connection plate by respective ones of the fastening members.

2. The electric storage device according to claim 1, wherein each of the plurality of storage modules and/or the at least one of the first connection plate and the second connection plate includes a fastening portion fastened by one of the fastening members, the fastening portion being more easily deformable in the stacking direction than portions other than the fastening portion.

3. The electric storage device according to claim 2, wherein each main plate and sub-plate are fixed to each other in a plurality of fixing regions, and
wherein the fastening portion is disposed between two of the fixing regions that are adjacent to each other.

4. The electric storage device according to claim 3, wherein the fastening portion has
a protruding portion that protrudes from the main plate or the sub-plate,
a fastening hole which is formed in the protruding portion and through which one of the fastening members extends, and
a cut portion formed by cutting a part of the protruding portion.

5. The electric storage device according to claim 4, wherein the fastening hole is spaced apart from the main plate in the stacking direction.

6. The electric storage device according to claim 2,
wherein each of the pair of end plates includes a first fastening portion as the fastening portion,
wherein each of the first connection plate and the second connection plate includes a second fastening portion as the fastening portion, and
wherein the first fastening portion and the second fastening portion corresponding to the first fastening portion project toward each other and include top portions that are in contact with each other.

7. The electric storage device according to claim 1,
wherein each of the plurality of storage modules includes a restraining band that connects the pair of end plates to each other, the restraining band including end-plate fixing portions at both ends thereof, the end-plate fixing portions being located on outer surfaces of the stack of storage cells in the stacking direction, and
wherein the pair of end plates are fixed to the end-plate fixing portions, respectively.

8. The electric storage device according to claim 7,
wherein the first connection plate and the second connection plate are fastened to the sub-plate of each of the pair of end plates, and
wherein the sub-plate of each of the pair of end plates is fixed to the end-plate fixing portions.

9. The electric storage device according to claim 1, wherein the plurality of storage modules comprises at least three storage modules arranged next to each other in the direction perpendicular to the stacking direction, and
wherein the at least three storage modules are clamped between the first connection plate and the second connection plate.

10. The electric storage device according to claim 1, wherein the end plates of adjacent storage module have different shapes, are plane-symmetrical with respect to each other, and are not interchangeable.

11. The electric storage device according to claim 1, wherein the first and second connection plates each include an opening through which a storage-module terminal is exposed.

12. The electric storage device according to claim 11, further comprising a storage-module busbar directly connected to the storage-module terminal.

13. An electric storage device comprising:
a first connection plate;
a second connection plate;
a first fastening member;
a second fastening member;
first and second storage modules provided between the first connection plate and the second connection plate in a stacking direction, each of the first and second storage modules including a plurality of rectangular storage cells stacked in the stacking direction to provide a stack of storage cells, the first and second storage modules being arranged next to each other in a direction perpendicular to the stacking direction, the first and second storage modules being clamped between the first connection plate and the second connection plate, the first connection plate being fastened to the first storage module in the stacking direction by the first fastening member;

a first end plate including a main plate and a substantially linear sub-plate stacked on an end of the first storage module in the stacking direction;

a second end plate including a main plate and a substantially linear sub-plate stacked on an end of the second storage module in the stacking direction;

a first fastening portion on the first end plate that protrudes outward toward the first connection plate; and a second fastening portion on the second end plate that protrudes outward toward the first connection plate, wherein the first end plate is fastened to the first connection plate by the first fastening member, which is inserted into the first connection plate and the first fastening portion in the stacking direction, and the second end plate is fastened to the first connection plate by the second fastening member, which is inserted into the first connection plate and the second fastening portion in the stacking direction, wherein the first fastening portion is disposed at a first location relative to a center of the first end plate and the second fastening portion is disposed at a second location relative to a center of the second end plate, the first location and the second location being different locations when the first location is considered with respect to the center of the first end plate and the second location is considered with respect to the center of the second end plate as viewed in the stacking direction toward the first and second storage modules, and wherein the first end plate and the second end plate are adjacent to each other in the direction perpendicular to the stacking direction and have respective sub-plates extending linearly from a first corner to a second corner thereof, the first corner and the second corner of the sub-plate of the first end plate being oriented in a different direction as compared a direction in which the first corner and the second corner of the sub-plate of the second end plate are oriented, with respect to the direction perpendicular to the stacking direction.

14. The electric storage device according to claim 13, wherein the first and second fastening portion are each in direct contact with the first connection plate.

15. The electric storage device according to claim 13, wherein each first and second fastening portion includes a protruding portion that protrudes outward toward the first connection plate, the first and second fastening members extending through a center of the protruding portion of each respective fastening portion.

16. The electric storage device according to claim 1, wherein different shapes of the adjacent end plates are observable when the end plates are viewed in the stacking direction toward the plurality of storage modules and when the adjacent end plates are compared continuously in the direction perpendicular to the stacking direction.

17. The electric storage device according to claim 1, wherein a first end plate of the end plates includes:

a protruding portion that protrudes from the first end plate;

a fastening hole formed in the protruding portion through which one of the fastening members extends; and a cut portion that includes a through hole extending through the protruding portion, the through hole being spaced apart from the fastening hole.

18. The electric storage device according to claim 1, wherein each main plate and sub-plate provide different shapes to the adjacent end plates that are adjacent to each other in the direction perpendicular to the stacking direction.

19. The electric storage device according to claim 17, wherein each main plate and sub-plate provide different shapes to the adjacent end plates that are adjacent to each other in the direction perpendicular to the stacking direction, the cut portion being disposed on the sub-plate of the first end plate, the protruding portion protruding away from the rectangular storage cells in the stacking direction.

20. The electric storage device according to claim 18, wherein the orientation of each sub-plate relative to each respective main plate provides the different shapes to the adjacent end plates that are adjacent to each other in the direction perpendicular to the stacking direction.

21. The electric storage device according to claim 1, wherein each main plate and sub-plate are joined to each other in a fixing region, and at least three adjacent end plates are adjacent to each other in the direction perpendicular to the stacking direction, the at least three adjacent end plates having different shapes as compared to an immediately adjacent one of the at least three adjacent end plates when viewed in the stacking direction toward the plurality of storage modules, the different shapes being formed by the sub-plate of each of the at least three adjacent end plates.

22. The electric storage device according to claim 1, wherein each of the plurality of storage modules includes a storage module terminal electrically connected to the stack of storage cells, and each of the end plates is not electrically connected to the storage module terminals.

23. The electric storage device according to claim 1, wherein each sub-plate has a maximum length that extends from the first corner to the second corner, the first corner being an upper corner of the respective sub-plate, the second corner being a lower corner of the respective sub-plate, and wherein a length of each sub-plate, as measured in a direction perpendicular to the maximum length and perpendicular to the stacking direction, is smaller than the maximum length.

24. The electric storage device according to claim 13, wherein each sub-plate has a maximum length that extends from the first corner to the second corner, the first corner being an upper corner of the respective sub-plate, the second corner being a lower corner of the respective sub-plate, and wherein a length of each sub-plate, as measured in a direction perpendicular to the maximum length and perpendicular to the stacking direction, is smaller than the maximum length.

* * * * *